United States Patent
Fan

(10) Patent No.: US 8,129,941 B2
(45) Date of Patent: Mar. 6, 2012

(54) POWER SUPPLY WITH REGULATION OF VOLTAGE BOOSTING TIME

(75) Inventor: Chih-Fu Fan, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 671 days.

(21) Appl. No.: 12/262,603

(22) Filed: Oct. 31, 2008

(65) Prior Publication Data

US 2010/0115292 A1     May 6, 2010

(51) Int. Cl.
    *H02M 7/00*     (2006.01)
(52) U.S. Cl. ........................................... 320/107
(58) Field of Classification Search .................. 320/107, 320/146

See application file for complete search history.

(56) References Cited

U.S. PATENT DOCUMENTS

| | | | |
|---|---|---|---|
| 4,039,920 A * | 8/1977 | Popp | 320/146 |
| 5,655,022 A * | 8/1997 | Carroll | 380/263 |
| 2004/0027101 A1 * | 2/2004 | Vinciarelli | 323/259 |
| 2006/0114698 A1 * | 6/2006 | Hatakeyama | 363/20 |

* cited by examiner

*Primary Examiner* — Arun Williams
(74) *Attorney, Agent, or Firm* — Muncy, Geissler, Olds & Lowe, PLLC

(57) ABSTRACT

A multi-voltage power supply includes a transformer connecting to an AC power source to regulate voltage and deliver voltage-transformed electric power, a rectification output circuit connecting to the transformer to rectify the voltage-transformed electric power and output first DC power, and at least one voltage regulation circuit to receive the first DC power from a first DC power output line and regulate to become second DC power. The first DC power on the first DC power output line reaches a first potential after a voltage boosting period. The rectification output circuit has a rear end installing a hysteresis unit which adds a delay time in the voltage boosting period to defer the time of the first DC power reaching the first potential. Thereby the time difference between delivering DC power output of the first DC power and the second DC power can be regulated to avoid abnormal start of computers.

5 Claims, 4 Drawing Sheets

POWER SUPPLY WITH REGULATION OF VOLTAGE BOOSTING TIME

FIELD OF THE INVENTION

The present invention relates to a multi-voltage power supply and particularly to a power supply capable of providing multiple voltages and regulating voltage boosting time of different output voltages.

BACKGROUND OF THE INVENTION

The motherboards of the present computer systems mostly adopt ATX (Advanced Technology Extended) architecture. Compared with the traditional AT (Advanced Technology) architecture, the most significant feature of ATX architecture is adding a regular power supply of 5VSB and makes 3.3V the standard supply voltage. To provide suitable power supply to the ATX motherboard, the power supply must have capability to provide corresponding power output, including output voltages at 3.3V, 5V and 12V.

The conventional power supply conforming to the ATX architecture generally has an AC/DC transformer to generate DC power of different voltages to supply the ATX motherboard. However, energy conversion efficiency to generate the DC power through AC/DC transformation still leaves a lots to be desired, hence is not a satisfactory approach especially at present when energy saving is a big concern in the industry and public opinion. Moreover, output DC power is not stable in the aforesaid approach and operation of the motherboard could be affected. To address the concerns mentioned above, a technology adopted a Voltage Regulator Module (VRM) has been developed. Adopted such a technique, the AC/DC transformer of the power supply outputs only DC power of 12V, and a VRM circuit is added at the rear end of the transformer to allow the DC power of 12V to be transformed through a DC/DC approach to become DC power of 5V or 3.3V. The DC/DC transformation has improved energy transformation efficiency over the AC/DC transformation. Thus energy resource can be better utilized and energy saving effect can be achieved. In addition, DC/DC transformation also provides more stable DC power at low voltages, therefore can enhance operation reliability of the motherboard.

While the power supply adopted the VRM circuit has improved energy transformation efficiency, there is a time series difference during output of 12V and 5V/3.3V. FIG. 6 illustrates an example of voltage boosting process for DC power of 12V and 5V. The voltage 12V can be reached at time t1, but 5V is reached at time t2. Namely the DC power of 12V and 5V are supplied at different times of t1 and t2. In the general machine start condition, the ATX motherboard detects whether the power provided by the power supply is normal. The time difference between t2 and t1 for the DC power of different voltages could cause misjudgment of the motherboard and result in start failure of the computer system.

SUMMARY OF THE INVENTION

The primary object of the present invention is to regulate the delay time of DC power of different voltages output from a power supply to prevent misjudgment during detection of power supply and start failure. To achieve the foregoing object, the invention provides a multi-voltage power supply which includes a transformer connecting to an AC power source to regulate voltage and deliver voltage-transformed electric power, a rectification output circuit connecting to the transformer to rectify the voltage-transformed electric power and output first DC power, and at least one voltage regulation circuit to receive the first DC power from a first DC power output line and regulate to become second DC power. The first DC power on the first DC power output line reaches a first potential after a voltage boosting period. The rectification output circuit has a rear end connecting to a hysteresis unit which adds a delay time in the voltage boosting period to defer the time of the first DC power reaching the first potential. Thereby the time difference between delivering DC power output of the first DC power and the second DC power can be regulated.

The voltage regulation circuit is a DC voltage lowering circuit. The hysteresis unit includes a hysteresis resistor and a hysteresis capacitor that are coupled in parallel with the DC power output line and a diode located on the DC power output line. The rectification output circuit and the hysteresis unit are bridged by a voltage-stabilized circuit. The voltage regulation circuit is connected to the voltage-stabilized circuit to get the first DC power.

The power supply of the invention adopts the VRM technique to generate DC power of a low voltage to enhance energy transformation efficiency and stability of DC power supply. In addition, the time difference between delivering DC power output of the first DC power and the second DC power can be regulated to prevent misjudgment of the motherboard during power supply detection so that the motherboard can be driven to start machine normally.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
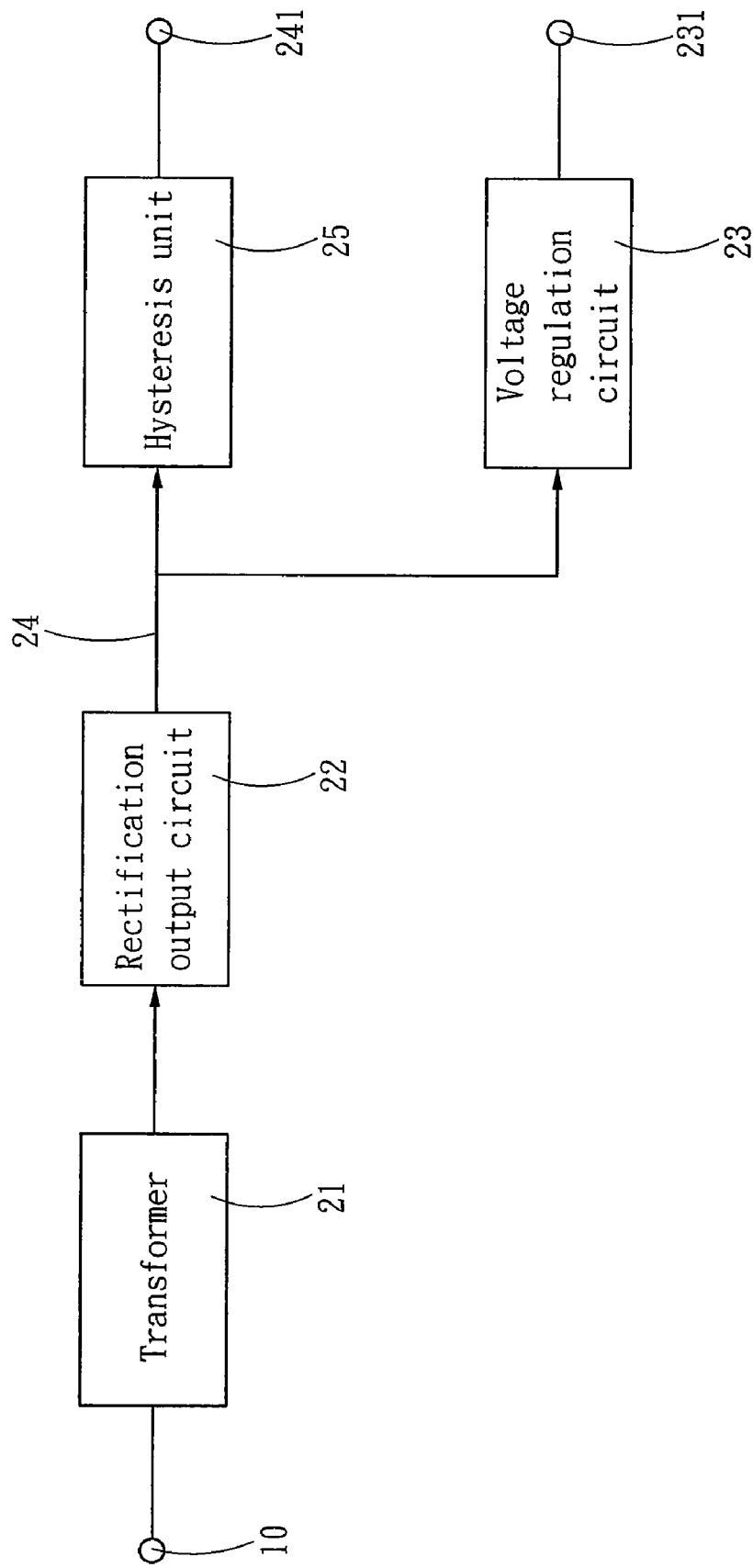
FIG. 1 is a circuit block diagram of an embodiment of the multi-voltage power supply of the invention.

Please refer to FIG. 1 for the circuit block diagram of an embodiment of the invention. The multi-voltage power supply according to the invention includes a transformer 21 connecting to an AC power source 10 to regulate voltage and deliver voltage-transformed electric power, a rectification output circuit 22 connecting to the transformer 21 to rectify the voltage-transformed electric power and output first DC power 241, and at least one voltage regulation circuit 23 to receive the first DC power 241 from a first DC power output line 24 and regulate to become second DC power 231. The rectification output circuit 22 has a rear end installing a hysteresis unit 25 which regulates the time of boosting the voltage of the first DC power 241 to a first potential.

Figure 2:
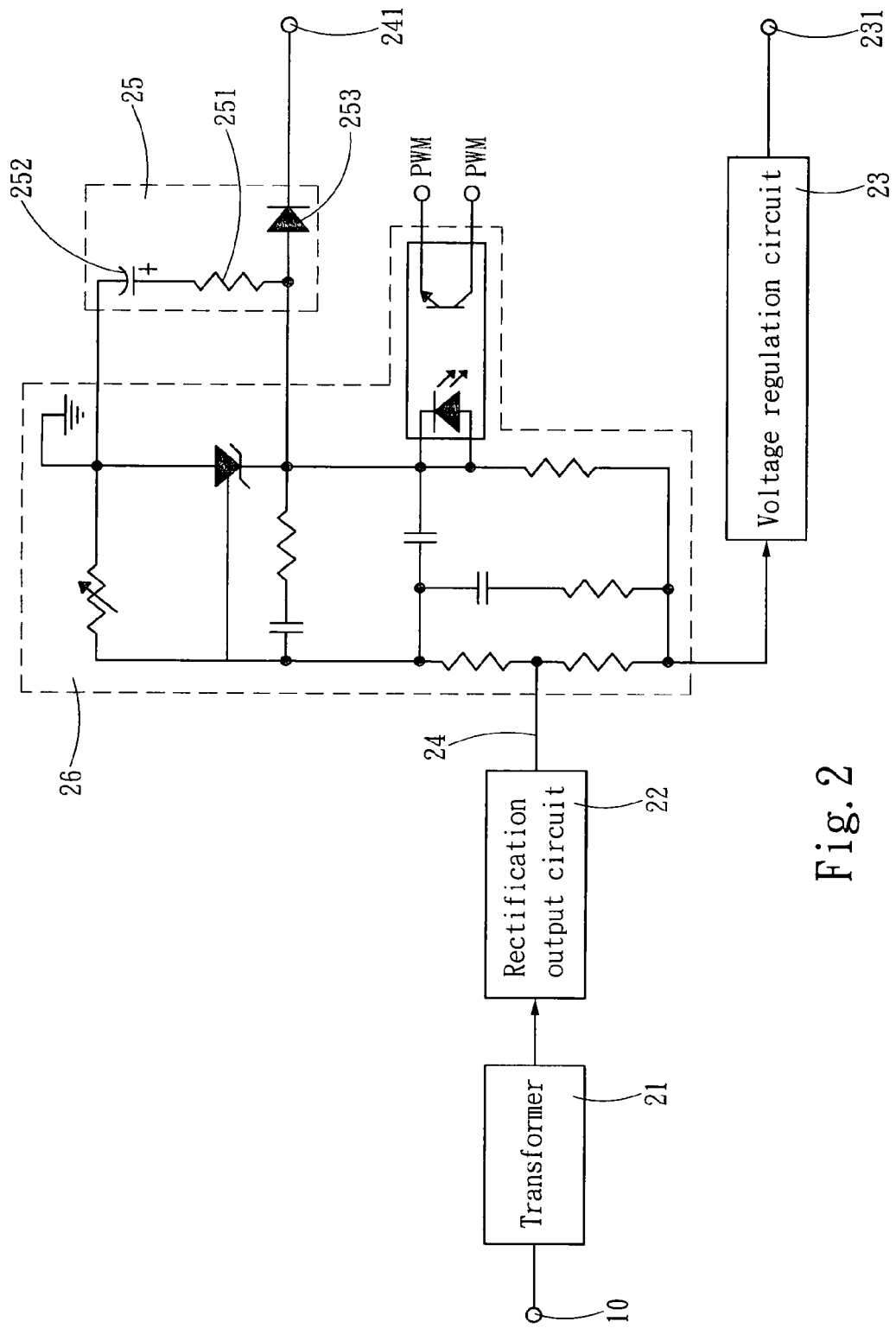
FIG. 2 is a circuit diagram of an embodiment of the multi-voltage power supply of the invention.
Figure 3:
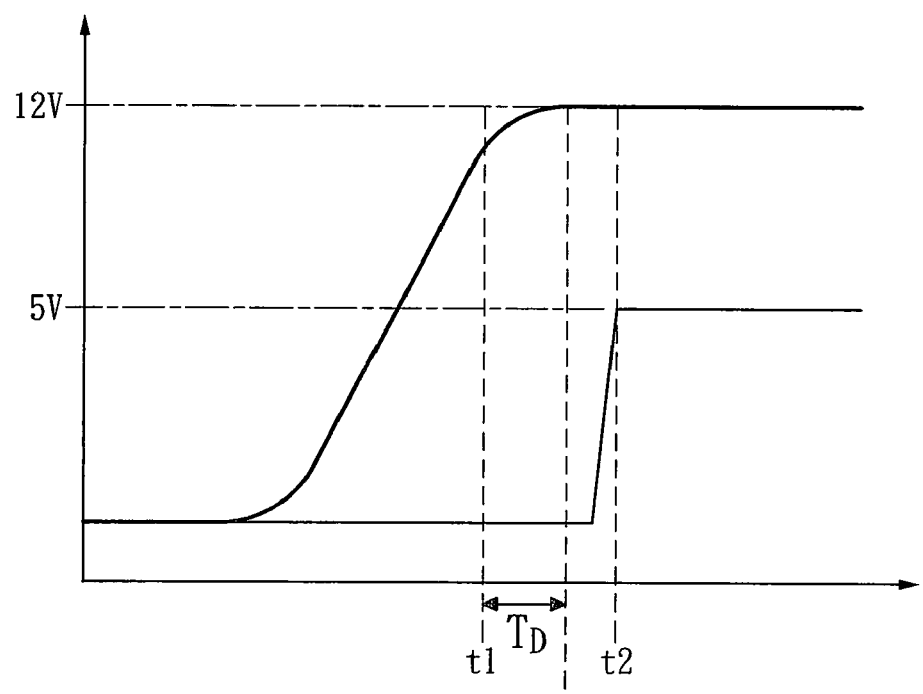
FIG. 3 is a time series chart for delivering DC power of 12V and 5V according to an embodiment of the invention.
Figure 6:
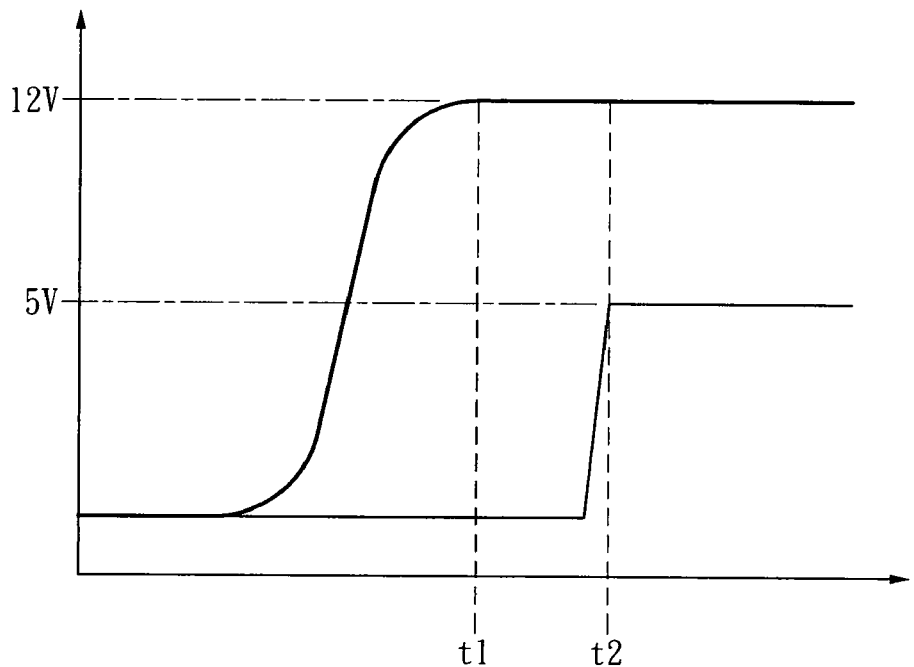
FIG. 6 is a time series chart for delivering DC power of 12V and 5V according to a conventional power supply adopted the VRM technique.

Refer to FIG. 2 for the circuit diagram of an embodiment of the invention. The AC power source 10 is city power to provide AC power. The transformer 21 regulates the AC power to become voltage-transformed power at a desired supply voltage. The AC voltage-transformed power goes through the rectification output circuit 22 to be transformed to DC power of 12V (the first DC power 241). As the first DC power 241 generated by the rectification output circuit 22 has an unstable voltage, in order to provide steady DC power required by an electronic load at the rear end of the power supply, a voltage-stabilized circuit 26 is provided on the first DC power output line 24. On the other hand, the voltage regulation circuit 23 for transforming DC to DC is coupled with the voltage-stabilized circuit 26 to receive the first DC power 241 and transform to become the second DC power 231. In this embodiment, the second DC power 231 is 5V. This serves only as an example, not the limitation. Referring to FIG. 6, in a conventional technique the time (t2) of the second DC power 231 to reach 5V potential lags the time (t1) (also called voltage boosting time) of the first DC power 241 to reach 12V potential. Thus the invention adds the hysteresis unit 25 at the rear end of the voltage-stabilized circuit 26. The hysteresis unit 25 includes a hysteresis resistor 251 and a hysteresis capacitor 252 that are coupled in parallel with the first DC power output line 24, and a diode 253 located on the first DC power output line 24. The first DC power 241 entered the hysteresis unit 25 needs an additional delay time ($T_D$) to reach the first potential of the potential of 12V as shown in FIG. 3. Namely the first DC power 241 has to go through the time of t1+$T_D$ to output the potential of 12V. Adding of the delay time $T_D$ can regulate the time difference of the first DC power 241 and the second DC power 231 to reach respectively the first potential and the second potential. Hence when the motherboard performs detection of the power supply, the misjudgment that might otherwise occur can be avoided, and the computer system can be started normally.

Figure 4:
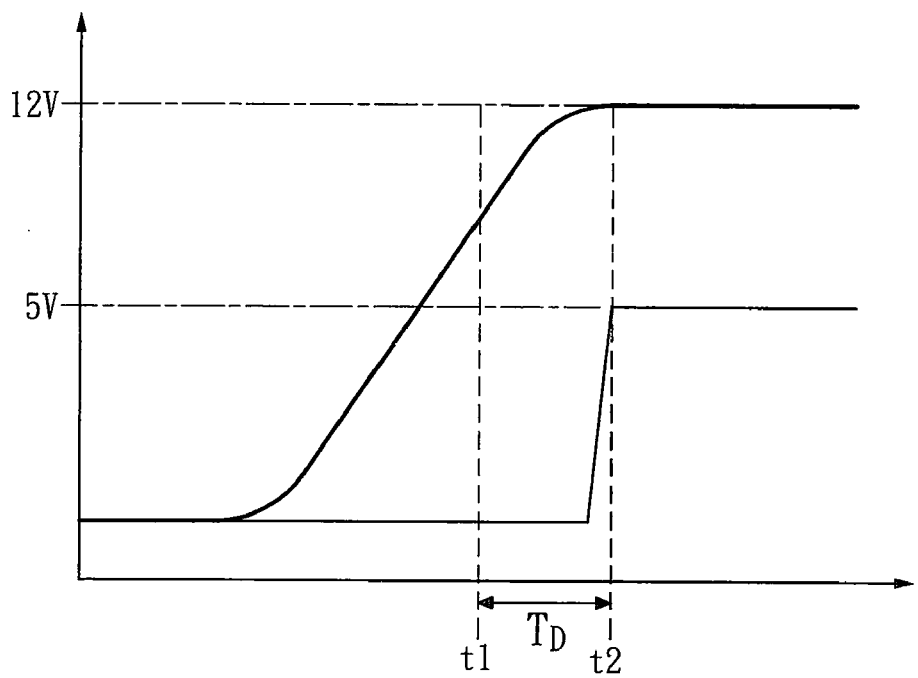
FIG. 4 is a time series chart according to the power supply of the invention showing delivering DC power of 12V is later than delivering DC power of 5V.
Figure 5:
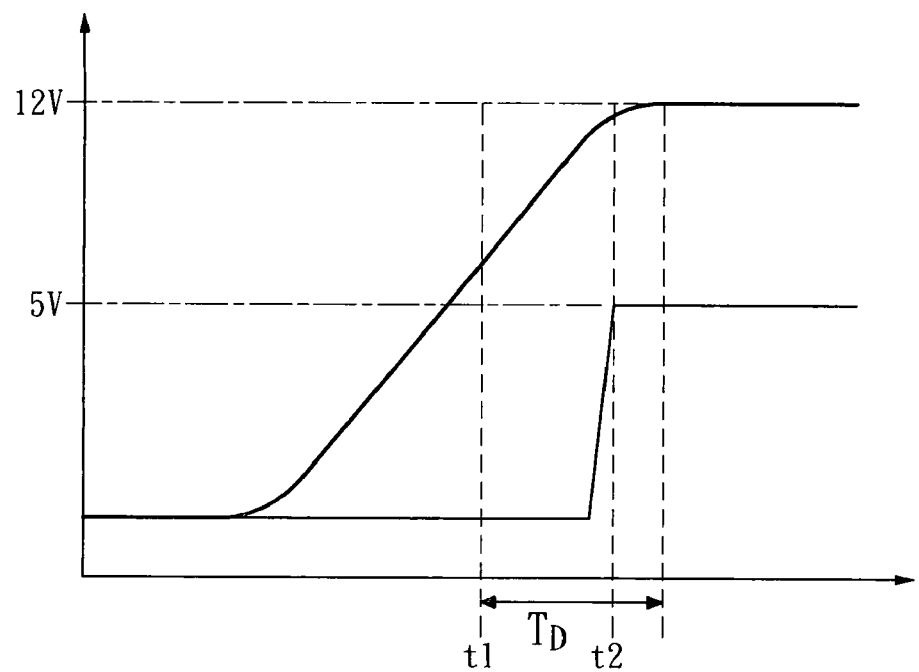
FIG. 5 is a time series chart according to the power supply of the invention showing DC power of 12V and 5V are delivered synchronously.

In the embodiment previously discussed, the time of delivering the first DC power 241 to reach the first potential is still later than the time of the second DC power 231 to reach the second potential. By choosing the delay capacitor 252 of varying capacitance, the delay time $T_D$ can be regulated to change the time taken by the first DC power 241 to reach 12V. For instance, by increasing the capacitance of the delay capacitor 252 the delay time $T_D$ increases so that the first DC power 241 reaches the first potential at a time later than the time of the second DC power 231 reaching the second potential, as shown in FIG. 4. Or a fine tuning may also be performed to allow the first DC power 241 and the second DC power 231 to reach the first potential and the second potential at the same time as shown in FIG. 5.

As a conclusion, the multi-voltage power supply of the invention can regulate the time difference of varying output voltages when the VRM technique is adopted to prevent misjudgment during power supply detection of the motherboard while the computer system is in start operation, thus abnormal machine start of the computer system can be avoided. Through the invention, not only the power supply adopted the VRM technique can be used in wider applications, energy utilization efficiency of the power supply increases, and steady DC power can be provided to the load at the rear end. It offers a significant improvement over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A multi-voltage power supply, comprising a transformer connecting to an AC power source to regulate voltage and deliver voltage-transformed electric power, a rectification output circuit connecting to the transformer to rectify the voltage-transformed electric power and output first DC power, and at least one voltage regulation circuit to receive the first DC power from a first DC power output line and regulate to become second DC power, the first DC power on the first DC power output line reaching a first potential when a voltage boosting period is elapsed, wherein:

the rectification output circuit has a rear end connecting to a hysteresis unit which adds a delay time in the voltage boosting period to defer the time of the first DC power reaching the first potential thereby to regulate the time difference between delivering DC power output of the first DC power and the second DC power.

2. The multi-voltage power supply of claim 1, wherein the hysteresis unit includes a hysteresis resistor and a hysteresis capacitor that are coupled in parallel with the first DC power output line and a diode located on the first DC power output line.

3. The multi-voltage power supply of claim 1, wherein the rectification output circuit and the hysteresis unit are bridged by a voltage-stabilized circuit.

4. The multi-voltage power supply of claim 3, wherein the voltage regulation circuit is connected to the voltage-stabilized circuit to get the first DC power.

5. The multi-voltage power supply of claim 1, wherein the voltage regulation circuit is a DC voltage lowering circuit.

* * * * *